United States Patent [19]

Miyakawa et al.

[11] 4,070,743
[45] Jan. 31, 1978

[54] APPARATUS FOR MOUNTING TENSION COIL SPRING ONTO ARTICLE

[75] Inventors: Seii Miyakawa, Yokohama; Takashi Kobayashi, Fujisawa; Masaya Kishi, Kamakura; Kenji Ogiro, Yokohama, all of Japan

[73] Assignee: Hitachi, Ltd., Japan

[21] Appl. No.: 719,582

[22] Filed: Sept. 1, 1976

[30] Foreign Application Priority Data

Sept. 3, 1975 Japan .................................. 50-105943

[51] Int. Cl.² ............................................. B23P 19/04
[52] U.S. Cl. .................................................. 29/227
[58] Field of Search ...................... 29/227, 225, 211 R

[56] References Cited

U.S. PATENT DOCUMENTS

| 3,017,691 | 1/1962 | Austin et al. | 29/227 |
| 3,747,895 | 7/1973 | Martin | 29/227 |

Primary Examiner—James L. Jones, Jr.
Attorney, Agent, or Firm—Craig & Antonelli

[57] ABSTRACT

An apparatus for mounting or fitting a tension coil spring onto spring retaining members of an article, said apparatus being adapted to restrain said spring at its both hook ends so that it may be stretched as it is conveyed from a supplying position to a mounting position, and to relieve the spring at said mounting position to allow the spring to shrink so that the spring may be delivered to the retaining members to be retained thereat.

12 Claims, 8 Drawing Figures

APPARATUS FOR MOUNTING TENSION COIL SPRING ONTO ARTICLE

The present invention is concerned with an apparatus capable of automatically performing the mounting or fitting of a tension coil spring onto an article or an apparatus.

Hitherto, in mounting or fitting of a coil spring exhibiting an extremely small tensile force onto an article, for example, as is the case of mounting of a filament onto a stem of a white light bulb or of a flourescent lamp, an apparatus has been employed having two fingers adapted to cramp respective ends of the spring to stretch the latter to a predetermined length required for the mounting on the article by shifting one of the fingers along the axial direction of the filament. This apparatus is, however, adaptable only for those springs having extremely small tensile forces, and could not be employed in the mounting of tensile coil springs which are expected to exert certain appreciable tensile forces.

Thus, the mounting of a tension coil spring has relied solely upon inefficient manual works, and has hindered the adoption of fully automated line of manufacture for those articles incorporating such a tension coil spring.

It is therefore an object of the invention to overcome the above explained shortcoming of the prior art by providing a novel apparatus for mounting a tension coil spring onto an article.

Another object of the invention is to provide an apparatus capable of automatically performing the mounting of a tension coil spring.

According to the invention, there is provided an apparatus for mounting a tension coil spring onto spring retaining means provided on an article, said apparatus having means for restraining hook ends of the tension coil spring delivered to a predetermined position and a pair of push rods adapted to convey or shift the spring toward the mounting position, said spring being adapted to be stretched to the desired length so that its both hook ends may be received by the retaining projections formed on the article. As the hook ends are moved to the root portions of the retaining projections, the tension coil spring shrinks by its own tensile force to be retained by the retaining projections.

The above and other objects and novel features of the invention will more fully appear from the following detailed description when the same is read in connection with the accompanying drawings. It is to be expressly understood, however, that the drawings are for the purpose of illustration only and is not intended as a definition of the limits of the invention.

Figure 1:
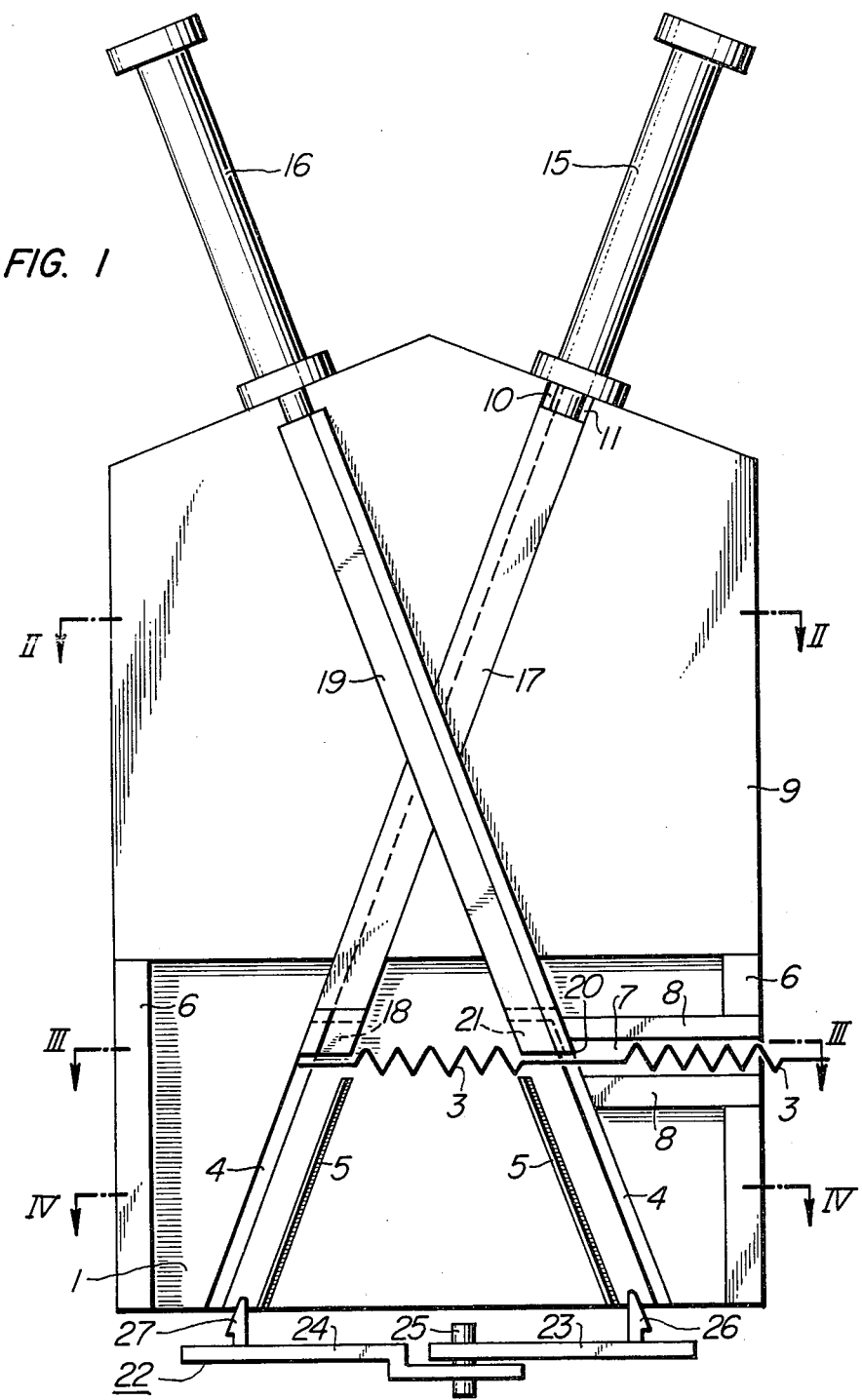
FIG. 1 is a front view of the first embodiment of the present invention with each one of the side plates and the guide plates removed.
Figure 2:
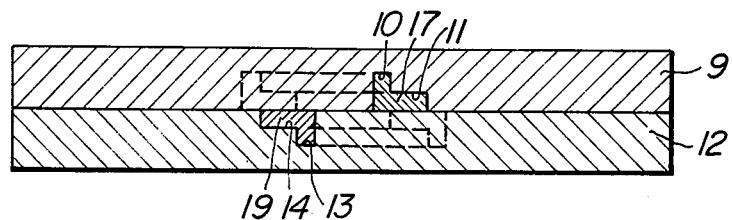
FIG. 2 is a sectional view taken along the line II—II of FIG. 1.
Figure 3:
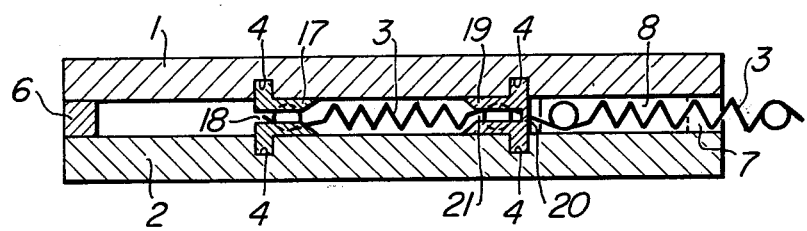
FIG. 3 is a sectional view taken along the line III—III of FIG. 1.
Figure 4:
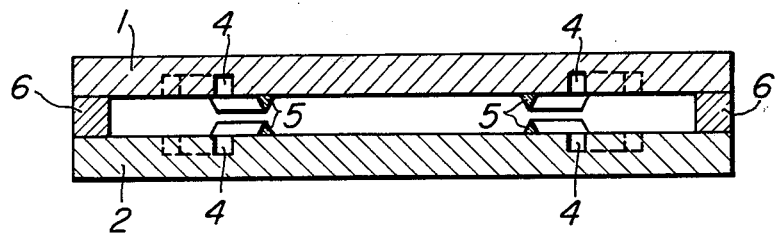
FIG. 4 is a sectional view taken along the line IV—IV of FIG. 1.

Referring at first to the first embodiment shown in FIGS. 1 to 4 inclusive, two side plates 1, 2 are disposed facing each other with spacers 6 interposed therebetween. At the surface of each side plate facing the other side plate, formed are a pair of guide grooves 4 and a pair of guides 5. The space between two guide grooves is narrower at the position for supplying a tension coil spring 3 and wider at the position for mounting the spring 3, while the guides 5 run in parallel with respective guide grooves 4 and project outwardly of the surface. A port 7 is defined by the side plates 1, 2 and by a pair of introduction guides 8 interposed between the side plates, for introducing a first one of the coil springs 3 to the supplying position, the springs being coiled successively in series.

A guide plate 9 is fixed to an end surface of the side plate 1 closer to the supplying position and has a groove 10 communicates with a groove 4 of the side plate 1. The guide plate 9 further has another groove 11 which is disposed in contact with the groove 10. Another guide plate 12 is secured to an end surface of the side plate 2 closer to the supplying position, and has a groove 13 which is in communication with the groove 4 of the side plate 2 and which is in contact with another groove 14 formed also in the guide plate 12.

On the guide plates 9 and 12, mounted respectively are pneumatic cylinders (referred to as cylinder or cylinders hereinafter) 15, 16. The cylinder 15 has a cylinder rod to one end of which secured is a push rod 17 having a protrusion adapted to engage the guide grooves 4 and its associated groove 10. Thus, the push rod 17 is allowed to slide along the grooves 10, 11, and the guide grooves 4 of both side plates 1 and 2, so as to move or convey one hook end of the tension coil spring 3 to the mounting position, which has been introduced into the supplying position. A groove 18 is formed at the end of the push rod 17. The other cylinder 16 has a cylinder rod connected at its one end by a push rod 19 having a protrusion adapted to be received by the groove 10 and its associated guide groove 4. The push rod 19 thus engages slidably the grooves 13, 14 of the guide plate 12 and the guide grooves 4 of both side plates 1 and 2. The push rod 19 thus slides along these grooves to cut the other hook end of the tension coil spring 3, thereby to separate the latter from subsequent springs, by a cutter 20, and then to move the cut hook end to the mounting position. The push rod 19 also has a groove 21 at its extreme end. An article generally designated at a numeral 22 on which the spring 3 is to be mounted has a movable part 24 and a stationary part 23 pivotally secured to each other by means of a pin 25. The parts 23 and 24 have retaining projections 26 and 27, respectively, for retaining the hook end of the tension coil spring 3.

In operation, at first the article 22 to which the tension coil spring 3 is to be secured is set at the mounting position. At the same time suitable feeding means (not shown) is energized to feed the tension coil springs 3 successively formed in series to the supplying position, through the port 7 for introduction. As the first coil 3 of the tension coil springs is set at the supplying position, the cylinders 15, 16 are energized to extend their push rods 17, 19, respectively. The downward movement of the push rod 19 causes the cutting of the end of the spring 3 thereby to separate the latter from the neighbouring or subsequent spring 3, which cutting is effected by means of a cutter 20 provided at the end of the push rod 19 in cooperation with the guide 8 forming the introduction port 7. The root portions of both hook ends of the separated tension coil spring 3 are forced into respective gaps formed between two opposing protrusions or guides 5 of the side plates 1, 2, by the further downward movements of the push rods 17 and 19, so that both hook ends of the tension coil spring 3 come to be restained by these guides 5. Still further downward movements of the push rods 17, 19 causes a stretching of the tension coil spring 3 which being restrained at both ends by the guides 5 as the spring 3 is moved downwardly toward the mounting position.

As the spring 3 is displaced to the other end surfaces, i.e. the end surfaces closer to the mounting position, of the side plates 1, 2, the hook ends of the tension coil spring 3 are forced into the retaining projections 26, 27 of the article 22. At this moment, the retaining projections 26 and 27 come to be received by the grooves 18, 21 of the push rods 17, 19, respectively. As the hook ends of the tension coil spring 3 reach the root portions of the hook retaining projections 26, 27, both hook ends are releaved so that the spring 3 is allowed to shrink to be retained by both retaining projections 26, 27. The cylinders 15, 16 are then reversed to pull the push rods 17, 19 up to the waiting position above the supplying position, while the article 22 now carrying the tension coil spring 3 is taken out of the apparatus for subsequent steps of process.

It will be understood that the successive springs 3 are conveniently cut and treated in the manner as described by the repeated actions of the apparatus.

Figure 5:
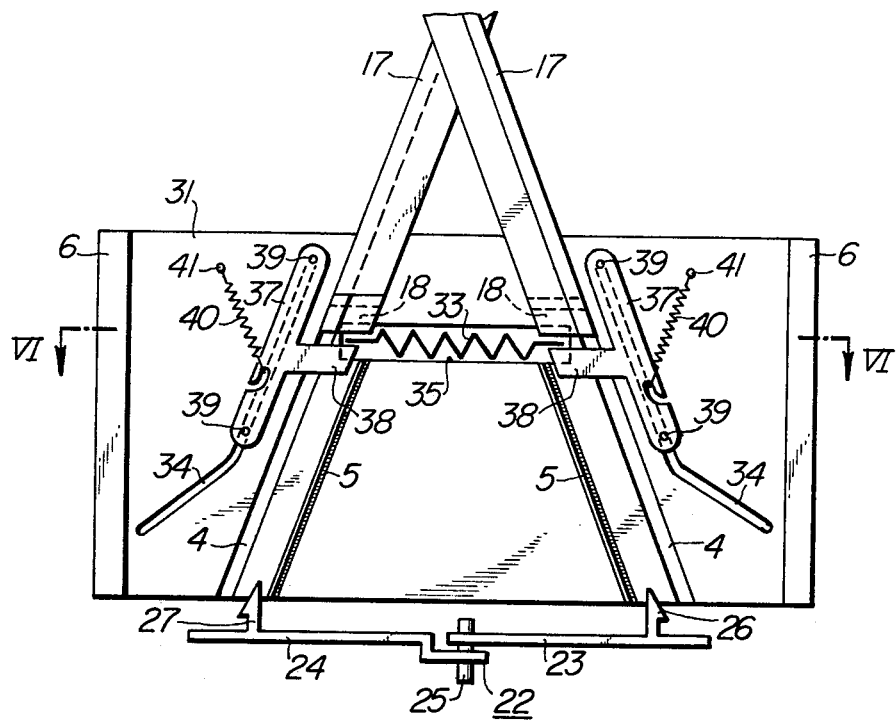
FIG. 5 is a front view of the essential part of the second embodiment of the present invention with one of the side plates removed.
Figure 6:
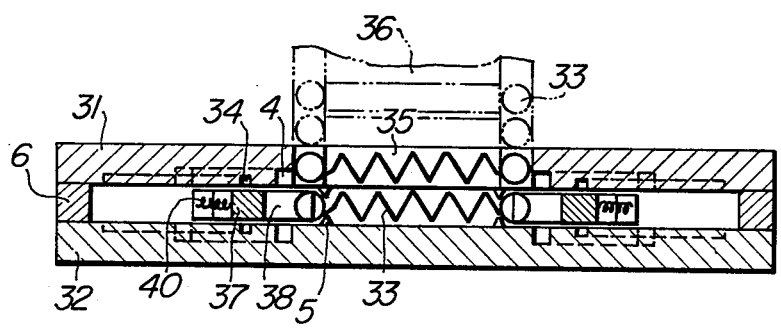
FIG. 6 is a sectional view taken along the line VI—VI of FIG. 5.

Referring now to the second embodiment shown in FIGS. 5 and 6, which differs from the first mentioned embodiment in that supporting means, as is explained later, is provided for supporting a tension coil spring which has been cut or separated prior to the setting at the supplying position, a pair of side plates 31 and 32 are disposed to oppose to each other with spacers 6 interposed there-between. The side plates 31, 32 have, respectively, a pair of guide grooves 4 and a pair of guides 5, in their surfaces facing each other.

The distance between the guide grooves 4 in each pair is larger as it gets closer to the mounting position, i.e. as it gets far from the supplying position, while the guides 5 project into the space or gap between the side plates 31, 32 and run in parallel with the associated guide grooves 4. A pair of grooves 34 are formed in each side plates 31, 32, which grooves 34 being in parallel with the guide grooves 4 at their portions closer to the supplying position and diverge at their other ends, i.e. their ends closer to the mounting position. A port 35 for introducing a tension coil spring 33 is formed in one side plate 31 at a position above the guides 5. Rail means 36 are provided for introducing successive tension coil springs 33 to the port 35, which springs being delivered successively from a feeding means which is not shown in the drawings.

A pair of supporting members 37 for supporting the tension coil spring 33 delivered from the port 35 are disposed between the side plates 31, 32 and are provided with respective projections 38 for catching the hook ends of the springs 33. The supporting members 37 further have, respectively, a pair of pins 39 adapted to be slidably received by the grooves 34 formed in the side plates 31, 32, so as to hold the supporting members 37 facing each other at their sides having the projections 38, between the side plates 31 and 32. A pair of pins 41 are fixed between the side plates 31, 32, which carry one ends of springs 40 which in turn are secured at their other ends to the spring supporting member 37 to bias the latter to one ends of the grooves 34 formed in the side plates 31, 32.

A pair of push rods 17 are provided with respective protrusions adapted to be received by the groove 4 and with respective end grooves 18. The push rods 17 are adapted to be supported and driven in a manner which is same as that of the first embodiment and, therefore, is not mentioned here. An article 22 has a movable member 24 rotatably secured to a stationary members 23, and the members 23, 24 are provided with hook retaining projections 26, 27, respectively.

In operation, the article 22 is placed at the mounting position, while the feeding means (not shown) delivers tension coil springs 33, through the rail means 36, successively. The first tension coil spring 33 is supported by the projections 38 by the supporting means 37, at their respective hook ends.

As the push rods 17 are synchronously moved from the supplying position to the mounting position, by means of a driving unit not shown, they come to cooperate with the projections 38 of the supporting members 37 in catching or fixing the hook ends of the tension coil spring 33, therebetween. Further movements of the push rods 17 cause downward displacement of the tension coil spring 33 in resistance to the force exerted by the springs 40, during which the tension coil spring 33 is pulled and stretched since it is restrained at both its hook ends by the guides or projections 5 formed in the side plates 31, 32. The supporting members 37 also move toward the mounting position along the grooves 34 and the projections 38 come out of the guide grooves 4. As the tension coil spring 33 reaches the mounting position, both its hook ends are forced onto the retaining projections 26, 27 of the article 22.

The retaining projections 26, 27 are then received by the grooves 18 formed at the ends of the push rods 17. The tension coil spring 33 is relieved from the restraint as both its hook ends are moved to the root portions of the retaining projections 26, 27, and the spring skrinks to be retained on the article 22. The driving unit is then actuated to retract the push rods 17 to their waiting position. The spring supporting members 37 are returned to their original positions by the springs 40. The article 22 now equipped with the tension coil spring 33 is taken out from the apparatus.

It will be seen that above operation is repeated for the successive supply of the tension coil springs 33 which have been separated in advance to the supply.

Figure 7:
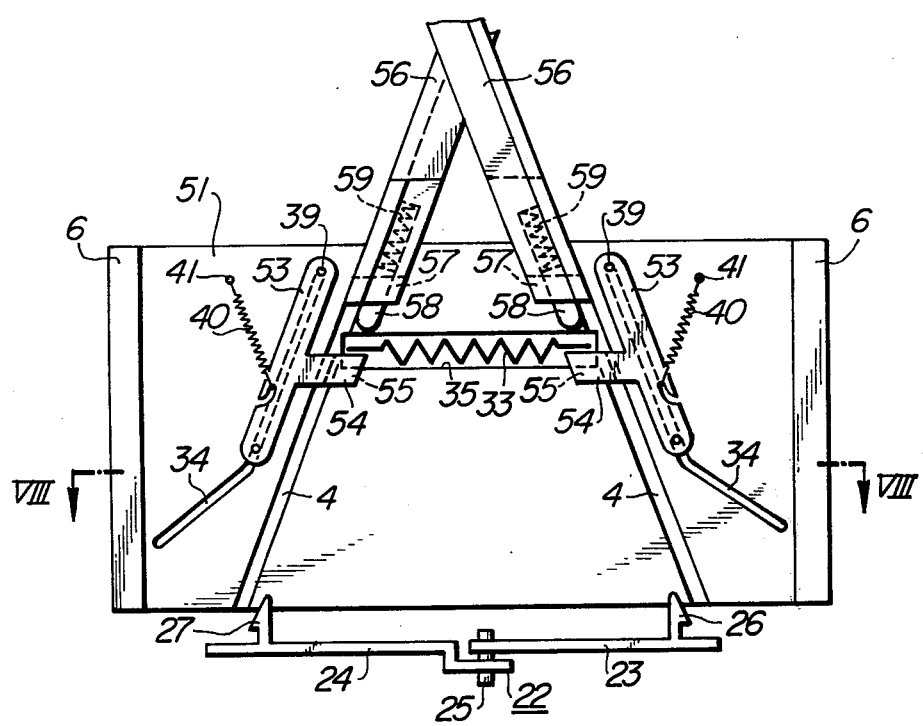
FIG. 7 is a front view of the essential part of the third embodiment of the present invention with one of the side plates removed.
Figure 8:
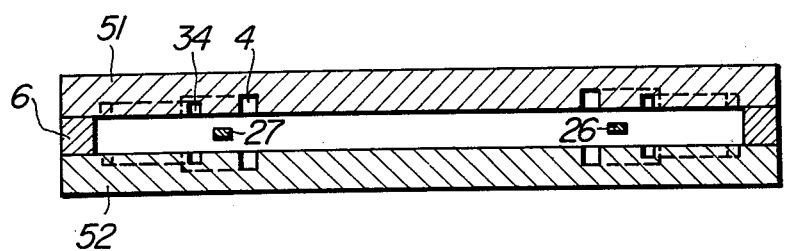
FIG. 8 is a sectional view taken along the line VIII—VIII of FIG. 7.

Referring now to FIG. 7, the third embodiment of the invention is shown which employs a different manner of restraint of the hook ends of the tension coil spring. A pair of side plates 51 and 52 are disposed to oppose to each other with spacers 6 interposed therebetween. The surfaces of the side plates 51, 52 facing each other are provided, respectively, with a pair of guide grooves 4 and a pair of grooves 34. The distance between the guide grooves 4 in each pair is larger at the portion closer to the mounting position than at the portion closer to the supplying position. The grooves 34 are disposed outwardly of the guide grooves 4 and have, respectively, portions closer to the supplying position which run in parallel with the guide grooves 4 and portions closer to the mounting position diverging outwardly.

A port 35 for introducing the tension coil spring 33 is formed in the side plate 51. A pair of spring supporting members 53 are provided with projections 54, respectively, each of which having a groove 55. Each of the spring supporting members 53 carries a pair of pins 39 adapted to be slidably received by the grooves 34 formed in the side plates 51, 52. The spring supporting members 53 are so arranged between the side plates 51, 52 as to face each other at their projections 38. A pair of springs 40 are provided to act between stationary pins 41 and the supporting members 53 so as to bias the latter toward the end of the groove 34 closer to the supplying position.

Each one of a pair of push rods 56 has a protrusion for engaging the guide groove 4 and a groove 57 at its extreme end. Each push rod 56 further has at its extreme end a slidable pilot pin 58 which is urged by a spring 59 to project outwardly from the extreme end of the push rod 56. The arrangements for supporting and driving the push rods 56 are the same with those of aforementioned embodiment and, therefore, is not mentioned here. The article 22 on which the tension coil spring is to be mounted has a movable member 23 rotatably secured to a stationary member 24 through a pin 25. The movable and stationary members 23, 24 are provided with hook retaining projections 26 and 27, respectively.

In operation, the article 22 is placed at the mounting position, while feeding means which are not shown in the drawings feeds the tension coil springs 33 successively through rail means and through the port 31 to the supplying position. The tension coil spring 33 is then supported by the projections 54 of the spring supporting members 53 at their hook ends.

Then, a driving unit is energized to advance the push rods 56 from the supplying position to the mounting position which causes the pilot pins 58 projecting from the push rods 56 to pass through the hooks of the tension coil spring 33 and to get into the groove 55 formed in respective projections 54 of the spring supporting members 53. Thus, the tension coil spring 33 is restrained at their hook ends by the pilot pins 58. The push rods 56 forces, during their movement toward the mounting position, the projections 54 and, accordingly, the spring supporting members 53, to move along the grooves 34. As the spring supporting members 53 get closer to the mounting position, the projections 54 are moved out away from the guide groove 4, and the tension coil spring 33 is stretched. As the push rods 56 reach the mounting position, the pilot pins 58 are pressed into respective push rods 56 resisting to the biasing force of the spring 59 upon abutting the hook retaining projections 26, 27. The push rods 56 moves downwardly until the hook ends come to engage the root portions of the retaining projections 26, 27, where the tension coil spring 33 is allowed to shrink to be retained by the projections 26, 27, i.e. on the article 22.

Then, the driving unit is actuated in the reverse direction to pull the push rods back to the waiting position above the supplying position, for receiving the subsequent tension coil spring 33. At this moment, the pilot pins 58 are allowed to project from the push rods 56 being biased by the springs 59, while the spring supporting members 53 are returned to their initial positions by the springs 40. The article 22 now equipped with the tension coil spring 33 is then taken out from the apparatus. The successive tension coil springs are treated in the same manner by the repeated action of the apparatus.

While preferred embodiments have been described using specific terms, such descriptions are for illustrative purposes only, and it is to be understood that changes and variations may be made without departing from the spirit or scope of the invention which is limited solely by the following claims.

I claim:

1. An apparatus for mounting or fitting a tension coil spring at both hook ends thereof onto two projections of an article comprising:
   a. conveying means for conveying said tension coil spring supplied at a predetermined supplying position to a distant mounting position where said two projections of the article are positioned, said conveying means having a pair of conveying members and driving means for driving said conveying members;
   b. guide means defining a pair of guide paths for allowing said conveying members to be carried therealong by said driving means from the supplying position to the mounting position and
   c. members for restraining said tension coil spring at its both hook ends during the conveyance of said spring from the supplying position to the mounting position by said conveying means;
   said guide paths being so formed that the pair of the conveying members guided by the guide paths are apart from each other in a non-stretched length of said spring at the supplying position and in a stretched mountable length of said spring at the mounting position, respectively, and that the space between the guide paths is gradually increased so as to gradually increase the space between the conveying members guided by said guide paths from the supplying position to the mounting position, and said restraining members removing restraint of said spring at the mounting position when the both hook ends of said spring have already been positioned in contactable position with said two projections of the article.

2. An apparatus for mounting or fitting a tension coil spring onto an article comprising: a pair of side plates disposed to oppose to each other with a predetermined space left therebetween, each of said side plates having a pair of guide grooves the space therebetween being smaller at their ends closer to a spring supplying position than at their ends closer to a spring mounting position and having a pair of guides projecting toward said guide grooves, a pair of push rods each of which slidably received in respective one of said guide grooves, said push rods having a recess at their ends, respectively, and a port for introducing said tension coil spring to said spring supplying position.

3. An apparatus for mounting or fitting a tension coil spring onto an article comprising: a pair of side plates disposed to oppose to each other with a predetermined space left therebetween, each of said side plates having a pair of guide grooves the space therebetween being smaller at their ends closer to a spring supplying position than at their ends closer to a spring mounting position and having a pair of guides projecting toward said guide grooves, a pair of push rods each of which slidably received by respective one of said guide grooves, each of said push rods having at its end a recess, a pair of spring supporting members disposed within said space between said side plates to oppose to said push rods to cooperate with said push rods in cramping respective hook ends of said tension coil spring, said spring supporting members being adapted to be moved outwardly of and away from said guide groove after the hook ends of said tension coil spring come to be restrained by said guides, and a port for introducing said tension coil spring to a predetermined supplying port.

4. An apparatus for mounting or fitting a tension coil spring onto an article comprising: a pair of side plates disposed to oppose to each other with a predetermined space left therebetween, each of said side plates having a pair of guide grooves the space therebetween being smaller at their ends closer to a spring supplying position than at their ends closer to a spring mounting position, a pair of push rods each of which slidably received by respective one of said guide groove, each of said push rods having at its end a recess, a pair of pilot pins slidably carried by respective one of said push rods and biased by springs to project out from said ends of said push rods, respectively, a pair of spring supporting members disposed within said space between said side plates and having respectively grooves at their surfaces opposing to said push rods for receiving respective one of said pilot pins, said spring supporting members being adapted to be moved away from and outwardly of said guide grooves when they are depressed by said push rods, respectively, and a port for introducing said tension coil spring to said spring supplying position.

5. An apparatus for mounting or fitting a tension coil spring onto an article, comprising:
a pair of means for conveying said tension coil spring supplied at a predetermined position until the hook ends of the coil spring engage with the hook receiving portions of the article placed in a predetermined position and held by them by construction of the coil spring due to its tension, each of said conveying means having an end face adapted to push the hook end of the coil spring and formed with a groove adapted to fit with the respective hook receiving portion of the article,
means for guiding said pair of conveying means so as to expand the distance between the hook ends of the coil spring supplied at the supplying position until it reaches to the predetermined distance between the coil receiving portions of the article, and
means for restraining the hook ends of the coil spring, while it is pushed and moved by said conveying means for expanding the distance between the hook ends thereof, to prevent the contraction of the coil spring by its tension, until the hook ends are held by the hook receiving portions of the article.

6. An apparatus according to claim 1, wherein said guide means includes a guide plate with a pair of guide grooves in which the conveying members are carried therethrough by the driving means, said restraining means comprises two pairs of guide projections, each pair of said guide projections being provided along each guide groove in such a manner that top edges of the respective projections in each pair oppose each other with a slight clearance therebetween so as to cause a root portion of said spring at each hook end to be restrained between the top edges of the guide projections.

7. An apparatus according to claim 6, wherein said plate is provided vertically with respect to the article, the distance between the guide grooves is gradually increased from the supplying position to the mounting position.

8. An apparatus according to claim 7, wherein said driving means comprises a pair of cylinders with cylinder rods connected to the conveying members so as to carry the conveying members along the guide grooves from the supplying position to the mounting position, said conveying members each having a respectively end face portion with which each hook end of the spring is contacted and in which a groove is provided, the groove in the end face portion of each conveying member allowing a part of each said projection of the article at the mounting position, so that each hook end of said spring is made in contactable position.

9. Apparatus for mounting or fitting an elongated extensible member onto an article in an extended configuration, said apparatus comprising:
a. retaining means for holding the end portions of said extensible member;
b. conveying means for transporting said retaining means from a first supplying position away from said article to a second mounting position adjacent said article;
c. guide means forming paths which diverge from said first position to said second position for causing said extensible member to be extended by said retaining means as it is transported by said conveying means along said paths to said mounting position; and
d. means enabling said extensible member to be released from said retaining means at said second position.

10. The apparatus according to claim 9, wherein said guide means forming paths which diverge comprises guide grooves within which said conveying means moves.

11. The apparatus according to claim 9, wherein said apparatus comprises additionally:
e. means for supplying a plurality of elongated extensible members joined in series in an end to end fashion to said retaining means, and
f. severing means associated with said conveying means and said means for supplying for cutting an extensible member from subsequent members in said series.

12. The apparatus according to claim 11, wherein said means for supplying is a port, said conveying means includes a push rod, and said severing means is a cutting formation on an end of said push rod which acts in conjunction with an edge of said port to sever said extensible member from said subsequent members.

* * * * *